Feb. 9, 1932.  E. A. SPERRY  1,843,959
TRACK RECORDER SYSTEM
Filed Feb. 6, 1924  6 Sheets-Sheet 1

Inventor
ELMER A. SPERRY.
By his Attorney
Herbert H. Thompson

Feb. 9, 1932.  E. A. SPERRY  1,843,959
TRACK RECORDER SYSTEM
Filed Feb. 6, 1924  6 Sheets-Sheet 2
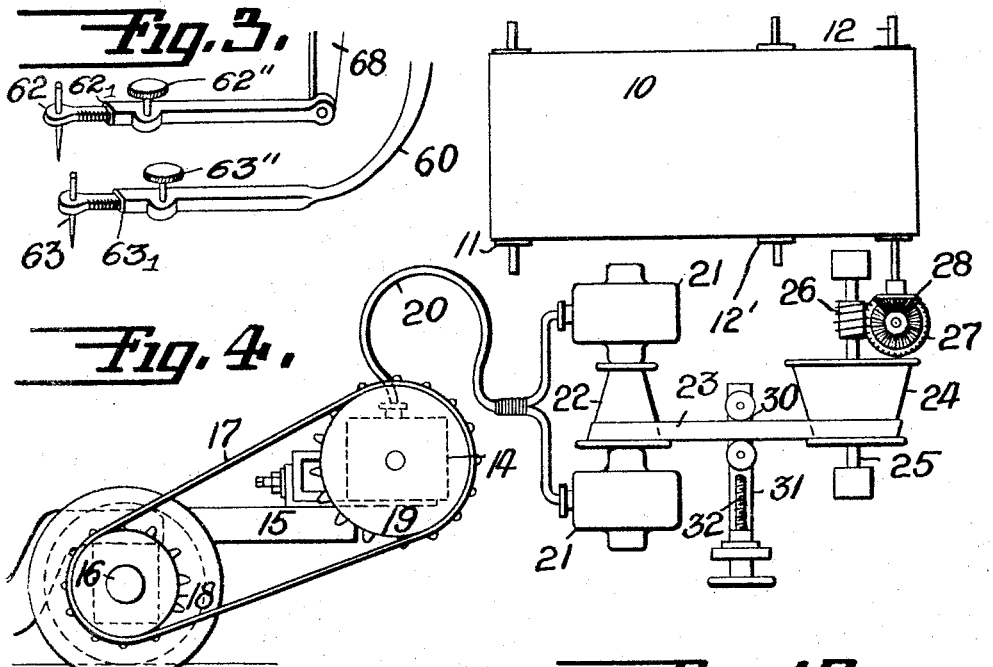
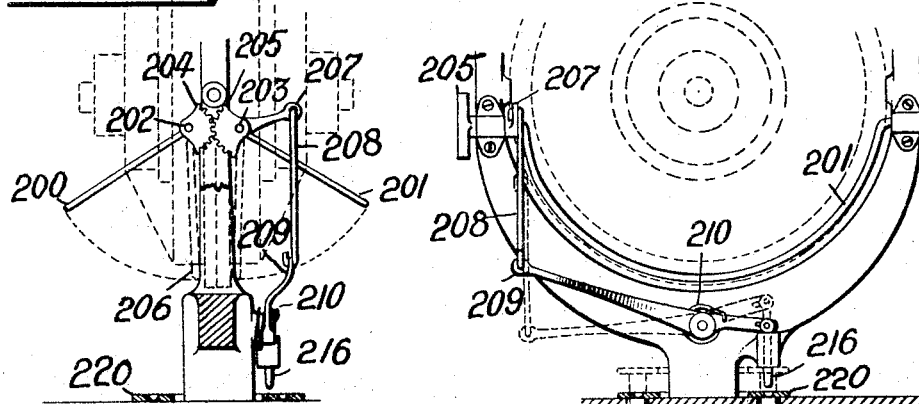
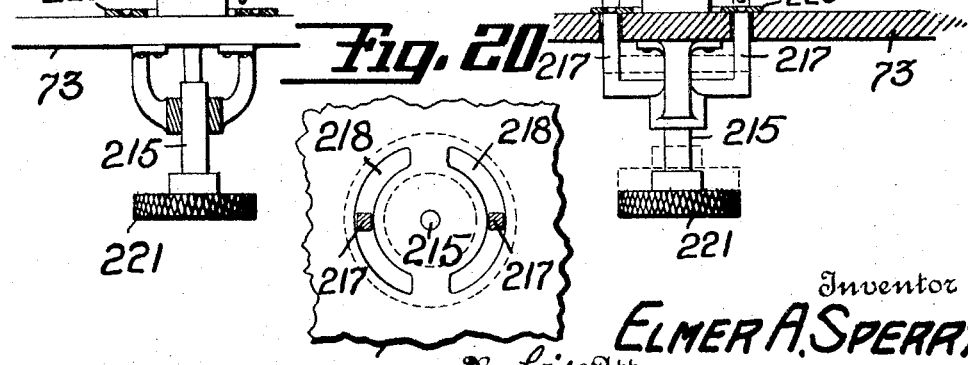
Inventor
ELMER A. SPERRY.
By his Attorney
Herbert H. Thompson Inventor
ELMER A. SPERRY.
By his Attorney
Herbert H. Thompson

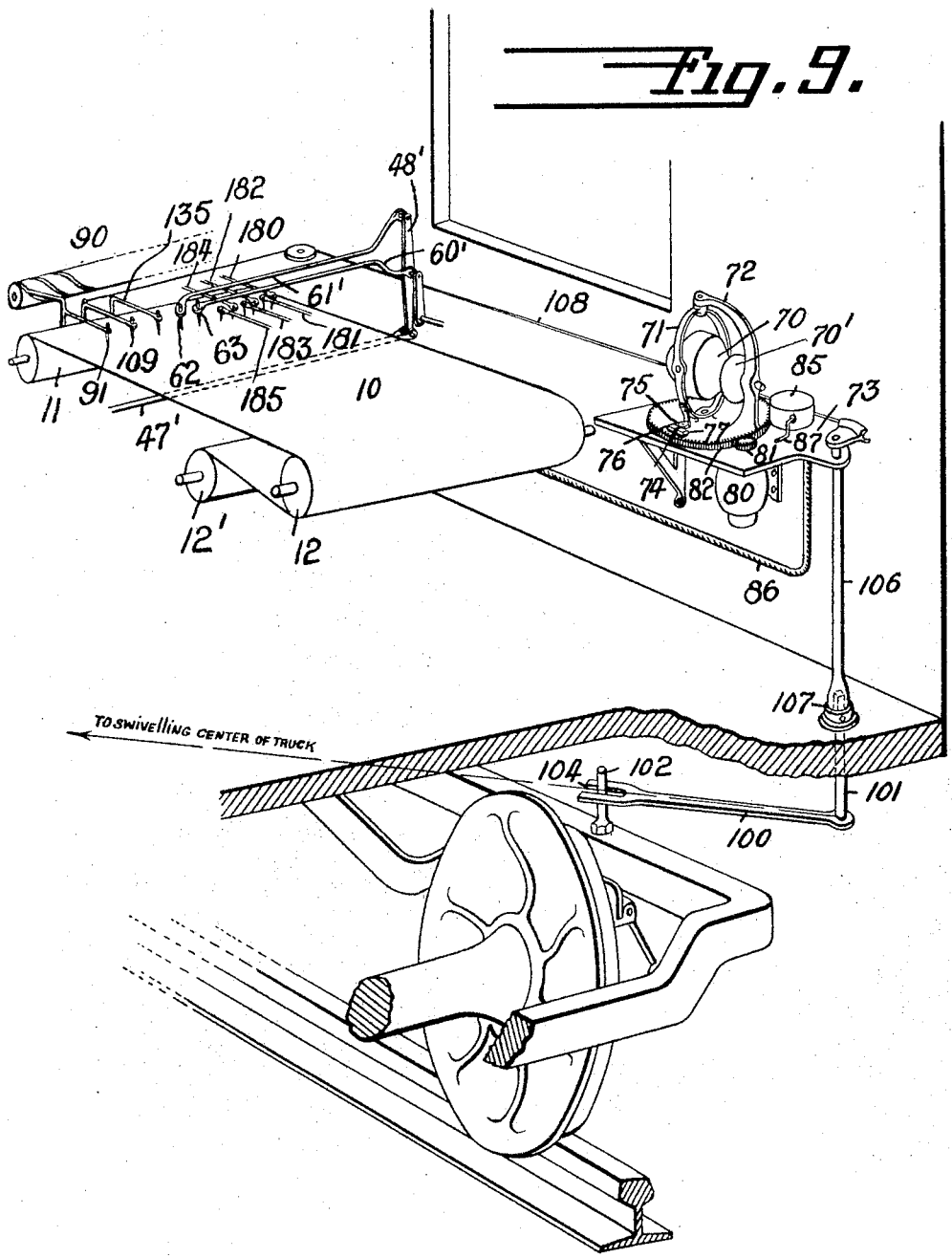

Feb. 9, 1932.    E. A. SPERRY    1,843,959
TRACK RECORDER SYSTEM
Filed Feb. 6, 1924    6 Sheets-Sheet 5
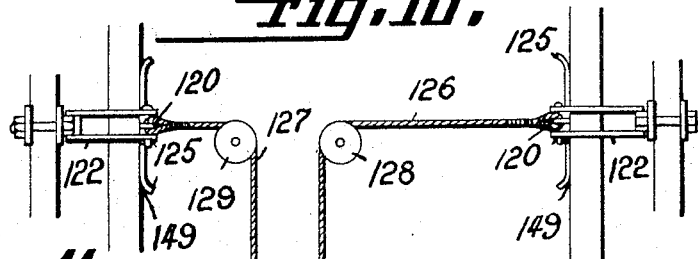
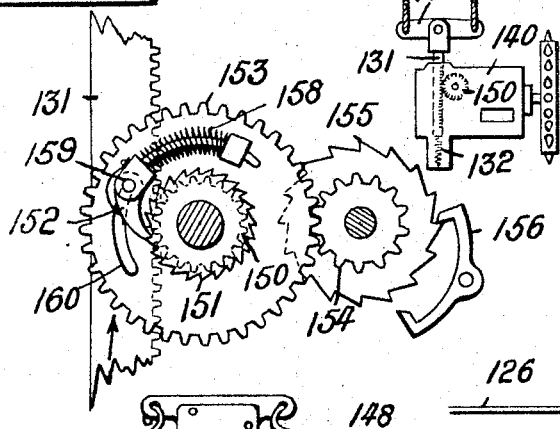
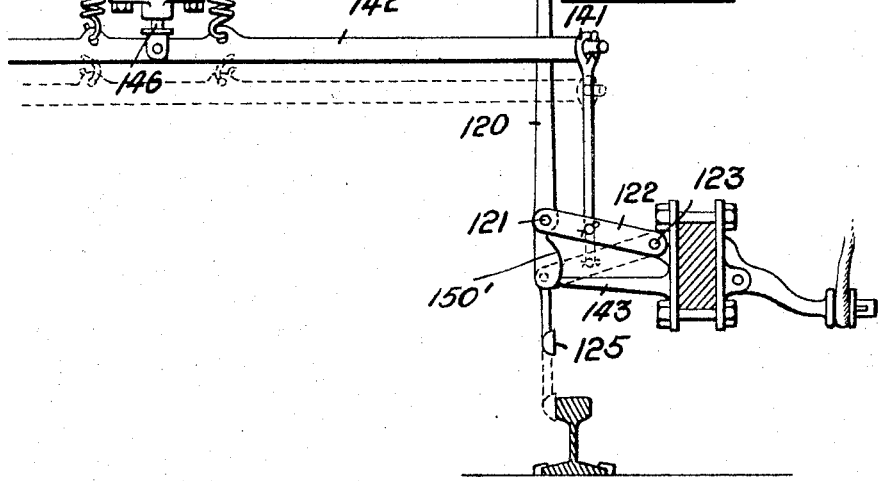
Inventor
ELMER A. SPERRY.
By his Attorney
Herbert H. Thompson

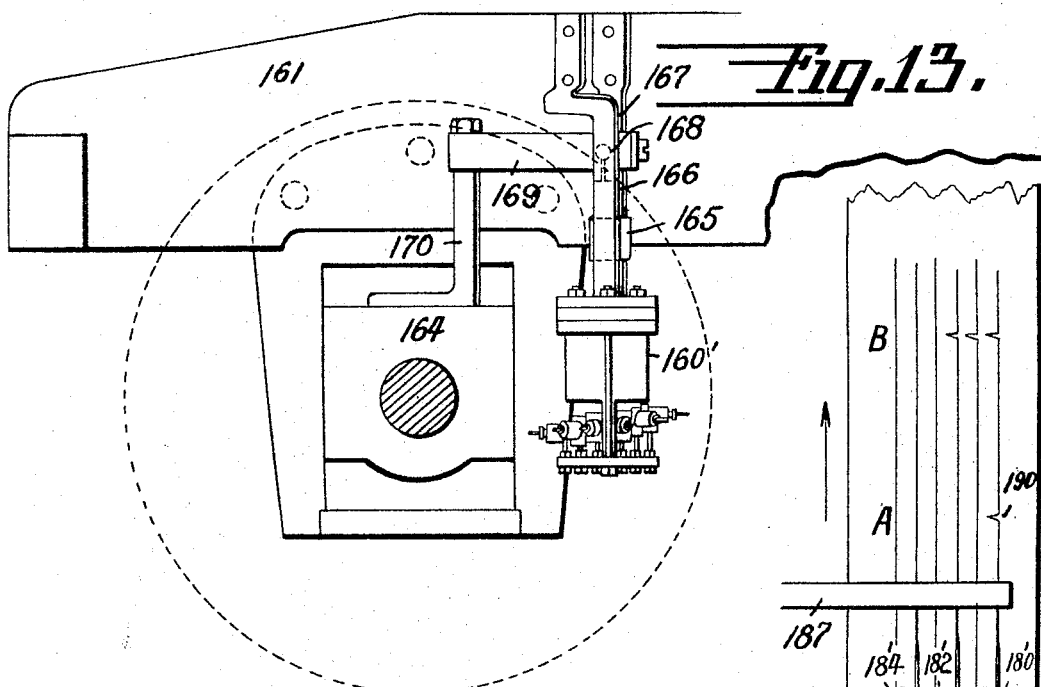
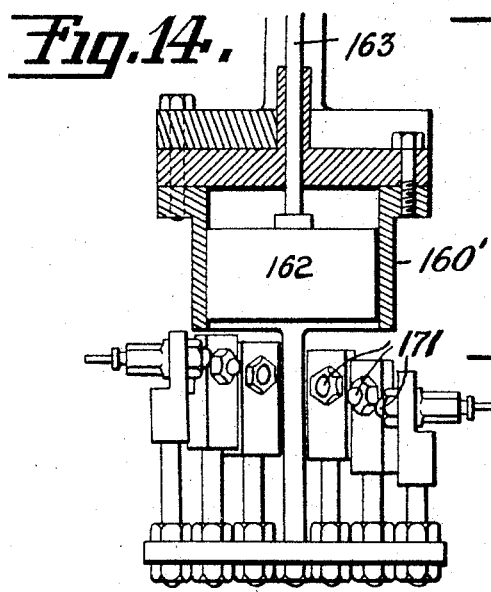
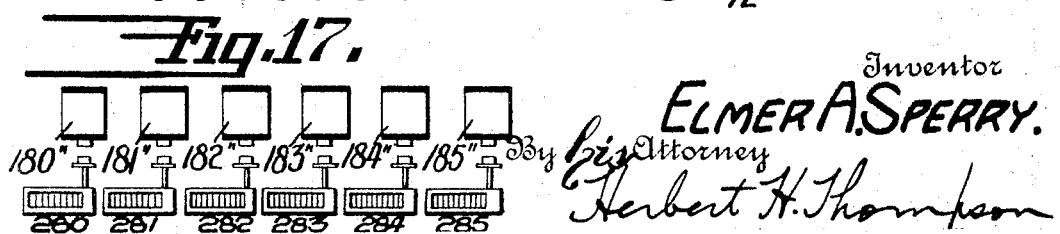

Patented Feb. 9, 1932

1,843,959

UNITED STATES PATENT OFFICE

ELMER A. SPERRY, OF BROOKLYN, NEW YORK, ASSIGNOR, BY MESNE ASSIGNMENTS, TO SPERRY PRODUCTS, INC., OF BROOKLYN, NEW YORK, A CORPORATION OF NEW YORK

TRACK RECORDER SYSTEM

Application filed February 6, 1924. Serial No. 690,930.

This invention relates to track recorder systems adapted to give a permanent record of those characteristics of railroad tracks which are of importance in obtaining maximum smoothness and speed of operation of vehicles traveling thereover. This invention has for its object to obtain permanent records of such characteristics under normal operating conditions, that is, the characteristics of the tracks while a vehicle is traveling over them so that the full gravity and tangenital pressures are operating on the tracks.

My invention contemplates further the use of a gyro track recorder equipment wherein gyroscopic means are employed to maintain one or more base lines from which deviations may be conveniently measured.

While my invention is suited with slight modification to the measurement of various track characteristics, I have illustrated herein my invention as applied to the determination of the following characteristics; (1) track elevation, for registering differences in elevation of the two rails; (2) track curvature, to obtain a record which will reveal whether the curves are as planned, whether they are standing up, whether they are polygons instead of curves, and any irregularities in curvature. The curvature is determined by the turning movements of the car body, but my invention contemplates also a separate record of the movements of the car truck to show the effect of any defects of curvature upon the movements of said truck; (3) variations in the track gauge, for the purpose of determining the distance between the rails to reveal spreading or narrowing of the rails. Provision must be made in the latter equipment for side to side lunge of the car; (4) the shocks experienced when passing over rail joints, for indicating differences of elevation between the meeting ends and especially low rail joints and also incidentally indicating unusual gaps between said ends.

My invention contemplates further provision for simultaneously making a permanent record upon a traveling chart of all of the above indications and of such other indications as time, passing mile posts, numbering and classifying low rail joints, as may be deemed desirable, all of said indications being plotted against rail distance as the ordinate, so that in their cooperative relation all the characteristics of any given portion of the track may be rendered visible at the same time and be accurately located on the roadbed.

A further object of my invention is to provide a record chart movable relative to the recording means at a rate which is a constant function of the car-speed, and hence of the distance traveled, so that not only the degree of the respective variations will be plotted but also the position of rails in which said variations are present.

Other objects and advantages of this invention will become apparent in the following detailed description thereof.

In the accompanying drawings,

Fig. 1 is a perspective view, largely diagrammatic, through a portion of a car body, and showing one form of my track-elevation recording device applied thereto.

Fig. 2 is an enlarged detail view of a gyroscope employed in the Fig. 1 device for maintaining the vertical.

Fig. 3 is a detail view showing an adjustable recording pen.

Fig. 4 is a view showing means for feeding a recording chart in constant relation to the speed of the car wheels, the car truck being shown in side elevation and the chart and driving mechanism therefor being shown in plan.

Figure 5:
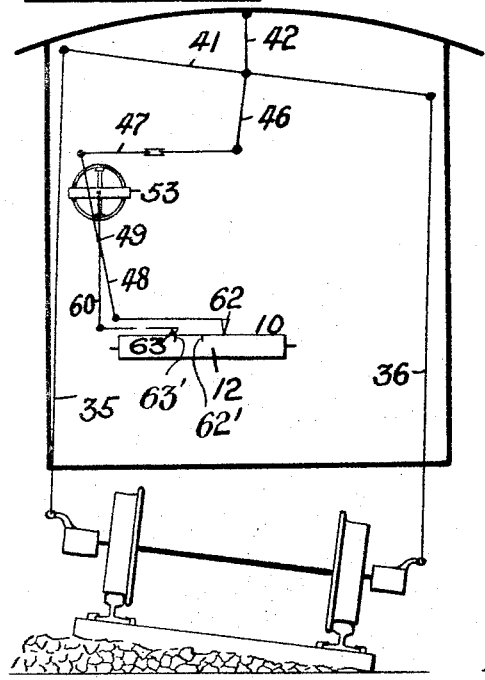

Figs. 5 to 8 inclusive, are diagrammatic representations of the operation of the track elevation recording device under various operating conditions.

Fig. 9 is a perspective view, largely diagrammatic, of the curve inspecting and recording device.

Fig. 10 is a plan view, largely diagrammatic, of the track gauge recording device.

Fig. 11 is an enlarged detail of the Fig. 10 device.

Fig. 12 is a front elevation, partly sectioned vertically, of another portion of the track gauge device not shown in Fig. 10.

Fig. 13 is a side elevation of a portion of a car truck showing a low rail-joint recorder mounted thereon.

Fig. 14 is a vertical section through the low rail-joint recorder of Fig. 13.

Fig. 15 is a plan view of the low rail joint registering mechanism.

Fig. 16 is a side sectional view of the Fig. 15 device.

Fig. 17 is a view largely diagrammatic of registering means cooperating with the low-rail joint recorder.

Fig. 18 is a side view of a centralizing and synchronizing device for an azimuth gyro shown in Fig. 9.

Fig. 19 is a front view of the device shown in Fig. 18.

Fig. 20 is a horizontal section taken just above the table in Fig. 19.

Referring to the drawings, it will be seen that the various records are adapted to be made upon a traveling chart, designated generally at 10, adapted to be unwound from a supply roll 11 and wound upon a suitable rewind roll 12′ after passing over a guide-roller 12 whose radius is constant and thus assures constant feeding of the chart for equal angular movements of roller 12. In order that the various records plotted may show variations as against length of track, it is necessary to feed the chart at a rate which bears a constant relation to the travel of the car along the rails. For this purpose, I drive an electric transmitter 14, mounted on the truck frame 15, from one of the car axles 16, preferably through a chain or perforated belt 17, and sprocket wheels 18 and 19. The transmitter 14 is connected by a flexible cable 20 to one or more synchronous motors 21 on the shaft of which is mounted a speed adjusting device such as a cone pulley 22, connected by a belt 23 to an oppositely-disposed cone-pulley 24, on a shaft 25, which drives the record propelling roller 12 through suitable gearing 26, 27, 28. It will be apparent that by shifting belt 23 axially of the cones, variable gearing is obtained between the car axle and the propelling roller. The belt may be shifted by means such as a pair of guide-rollers 30, engaging opposite sides of the belt and mounted on a sliding carriage 31, which may be operated by an adjusting screw 32. In this manner the chart may be fed at a given rate per mile of track, regardless of the diameter of the car wheels, a suitable rate of feed being 13.2 inches per mile.

Upon the chart, moving as above described, there is adapted to be made permanent records of various track characteristics. I shall describe first my track elevation recorder shown in Figs. 1 and 2 and comprising a pair of cables 35, 36, one at each side of the car and connected to the car trucks on opposite sides of the car, for example, in the manner shown in Figs. 5 to 8. The cables extend upwardly through guide tubes 37, 38, around guide-pulleys 39 and 40 to opposite ends of a beam 41 suspended at its center, preferably from the roof of the car, in a spring-supported journal 42. A rod 43 fixed at one end in said beam, is swivelly supported at its other end in a bracket 45 and extends longitudinally of the car. An arm 46 is fixed to said rod 43, and is pivotally connected to an adjustable link 47, pivotally connected to one end of a lever 48 of the first class. The pivot 49 of said lever 48 is stabilized by means of a gyroscope, shown more clearly in Fig. 2. Said gyroscope comprises a rotor spinning about a vertical axis in a vertical ring 52, mounted on a horizontal axis in horizontal ring 53, which is in turn, mounted on a horizontal axis, at right angles to said first horizontal axis, in fixed brackets 54. A gyroscope so mounted maintains a fixed vertical base line. A journal shaft 55 of ring 53, has fixed thereto an arm 56 to the lower end of which is fixed pivot 49 of lever 48. Arm 56 and the pivot 49 will, therefore, maintain a fixed vertical base-line. A pen-arm 60 is pivoted to an extension of pivot 49 and is adapted to maintain a predetermined relationship to the car body and chart 10 mounted thereon. This is effected by a parallel-motion device or linkage 88 whereby the pen-arm 60 is maintained parallel to the side wall of the car body and normal to the chart. Lever 48 carries at its lower end another pen-arm 61 carrying a pen 62, and arm 60 is formed with a lateral extension carrying a pen 63. Pen 62 cooperates with index or base-line 62′ indicating zero tilt of car axle, and pen 63 cooperates with index 63′ indicating zero bolt of car body.

Figure 6:
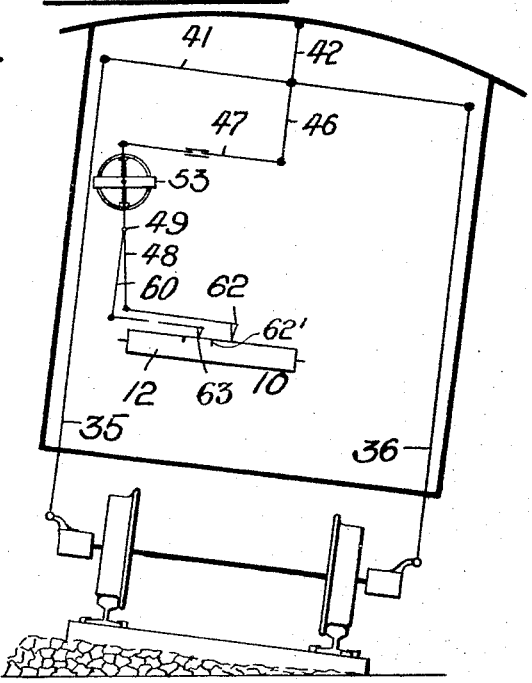
Figure 7:
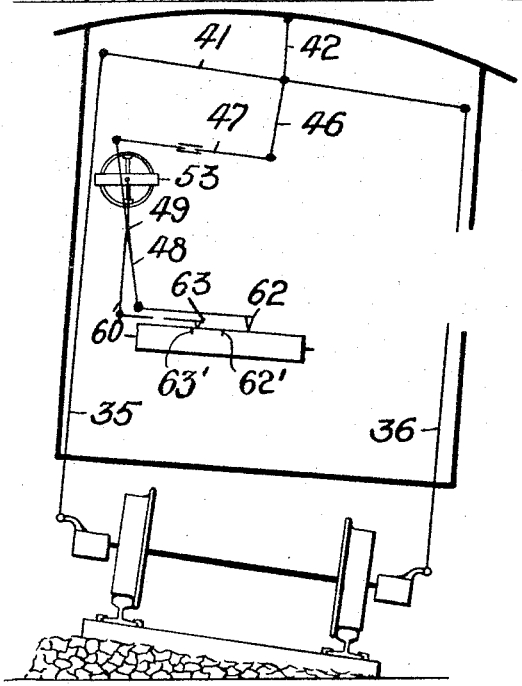
Figure 8:
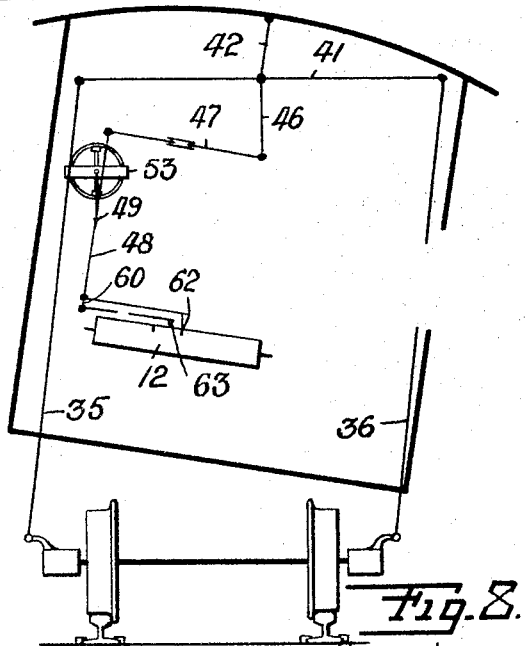

The operation of the track elevation recording device is simple. If one rail is lower or higher than the other, beam 41 will be rocked to an extent corresponding to the degree of difference in rail elevation, lever 48 will be rocked about fixed or stabilized pivot 49, and pen 62 will move relative to the chart to record the variation on the chart, measured either side of the base line 62′ showing absolute level track. Obviously since the pivot 49 is held in space, should the car body tilt for any reason, as on its springs, as in Fig. 8, the car body and chart carried thereby are moved relative to pivot 49 and the upper end of pen arm 60, and this movement is transmitted to pen 63 by the parallel-motion linkage 88, so that pen 63 thus records tilt of car body as distinguished from tilt of car axle. The vertical axis of the gyro remains vertical and maintains a rigid base while the car body tilts. The pen 62 moves together with the chart and rocks about pivot 49, said pen 62, therefore, maintaining the same relationship with respect to the chart regardless of tilt of the car body and is affected only by tilt of the car axle. That is to say, pen 62 tilts with the car and chart and is moved relative to the chart only when beam 41 is rocked due to difference in elevation of the rails. Pen 63 on the other hand shows only tilt of the car body. Figs. 6 and 7 show simultaneous tilt of both car body and car axle to the same degree and to different degrees, respectively, and illustrate the independent action of pens 62 and 63. There is thus obtained independent records showing any differences in elevation between the rails, i. e., tilt of the car axle, and tilt of the car body. In Figs. 6 to 8 inclusive the pen-arm carrying pen 63 is shown broken to permit the movements of pen 63 to be magnified for the purposes of illustration.

The pens 62 and 63 may be made adjustable with reference to the gyro, as shown in Fig. 3, to permit the pens to register with the zero reference line on the chart when the track is level. For this purpose the pens 62 and 63 may be movable in sleeves 62′, 63′, respectively by means of a rack and pinion connection to knobs or handles 62″, 63″.

If the load upon the gyro of the Fig. 1 device is large, there may be provided a follow-up system such as is employed in gyroscopic compasses. One form of follow-up system is shown in Fig. 2 and another form is shown in the Fig. 9 device described hereinafter. Also, the gyros may be of the air-damped or air-compensated type such as the one shown in the patent to M. M. Titterington, No. 1,324,482, December 9, 1919 or my copending application of Serial No. 625,831, filed March 17, 1923.

The follow-up shown in Fig. 2 may comprise a pair of live segments 64, 65 separated by an insulation strip 66 and movable with ring 53. A trolley 67, on an arm 68, forming an extension of arm 56, normally rests on the insulator strip 66. Said trolley and arm 56 are carried by a sleeve 69 rotatable upon an extension of the pivot 55 of ring 53. When trolley 67 engages contact 64 or 65 it energizes a two-way motor 78 in one direction or the other to cause said motor to rotate through suitable gearing sleeve 69 and trolley 67 in a direction to restore said trolley to initial position on the dead segment. In so doing, arm 56 and hence pivot 49 are caused to follow the movements of the gyro.

Upon the same chart 10, I record also the rail curvature or direction and the movements of the car truck in response to said curvature. The first of these records is obtained by utilizing the azimuthal movement of the car. For this purpose, I provide a gyro 70, having a horizontal spinning axis and mounted on a horizontal axis at right angles to the spinning axis in a vertical ring 71 in turn mounted on a vertical axis in a follow-up element 72 rotatably mounted in a fixed base 73. The gyro is thus stabilized in a horizontal plane so that its spinning axis will maintain a fixed horizontal base-line. Any movement of the car in azimuth, acting as it does as a true tangent or chord of any part of the curve, will result in relative movement of the gyro and car and hence relative movement of the longitudinal axis of the car with respect to said base-line fixed in space. Such movement is caused to actuate any suitable azimuth recording pen or pens, as, for instance, in the following manner. As the car turns, the gyro and its ring 71 will apparently turn relative to follow-up element 72, causing trolley 75 which normally lies on a dead segment 74 to engage live segment 76 or 77 to energize two-way motor 80 in one direction or the other to cause element 72 to follow the gyro through gearing 81, 82, until trolley 75 is again on dead segment 74. The follow-up element 72 is geared to drive an electric transmitter 85 which through cable 86 actuates suitable cam mechanism, shown diagrammatically at 90 as a cam roller, for operating a recording pen 91. Since the width of the recording chart is limited, and only a portion of this width is available for the azimuth record, clearer indications may be obtained by subdividing the available width not into 360 divisions but into some fraction thereof and providing additional zone pens for indicating in which portion of the azimuth scale the record is being made. Thus the available width may be subdivided into only 30 divisions. Four quadrant pens may be provided and in addition three 30° pens to indicate in which 30° section the azimuth pen is recording. Thus, if the third quadrant pen and the second 30° pen are effective, then the azimuth pen is operating between the limits 210° and 240° because the quadrant pen indicates limits of 180° to 270° and the 30° pen indicates the second 30° subdivision between 180° and 270°, i. e., 210° to 240°. These zone pens may be operated by cams on roller 90 in the manner shown in my copending application, Serial No. 547,599 for recorders for ships, filed March 29, 1922. The transmitter may be provided with a handle 87 so that the pen may be set in any desired initial position at will. Should the gyro 70 for some reason tilt about its horizontal axis of support it may again be centralized by pressing inwardly a cone 70′ adapted to engage one end of the gyro shaft. The centralizing cone may also be employed to lock the gyro when the latter is inactive.

Another form of locking and centralizing means and means for setting the gyro axis in any desired position is illustrated in Figs. 18 to 20. The locking or centralizing means may comprise a pair of bails or levers 200, 201 pivoted adjacent one end at 202, 203 on a bracket carried by ring 71 adjacent the axis of support of the gyro in said ring. The adjacent ends of the bails are geared together by gear sectors 204, 205 for equal and opposite movement when one of the levers or bails is operated. When the lower ends of the bails are drawn together they are adapted to engage a central lug or projecting rim 206 on the gyro casing and thus centralize the casing by swinging it about its axis of support in ring 71 and lock said casing in centralized position. For drawing the lower ends of the bails together one of said bails may be connected through an arm 207 and link 208 with one end of a lever 209 also pivoted upon ring 71 and normally rocked by a spring 210 to keep the bails in ineffective position out of engagement with the gyro casing. To render the bails effective against the action of said spring, there may be provided a plunger 215 adapted to engage a guided pin 216 pivoted on the other end of said lever to force the bails downwardly. Said plunger 215 may be in the form of a fork, the arms 217 of which extend upwardly through substantially semi-circular slots 218 in the base 73 to permit substantial circular movement of said arms. The arms 217 may carry a corrugated ring 220 at their upper ends surrounding the shank of ring 71 to facilitate non-slipping engagement with the pin 216. While thus engaged, it is obvious that rotation of plunger 215 by knob 221 will rotate ring 71 and the gyro about a vertical axis to set the gyro axis in any desired position in azimuth.

The response or behavior of the car truck to curves in the track may also be recorded. For this purpose, an arm 100 at the end of a shaft 101 may engage a pin 102 fixed upon the truck, exactly in line with the truck's swiveling center on straight track, said pin operating in the forked end 104 of arm 100. Shaft 101 is provided with an extension 106 to which it is connected by a detachable joint 107. Shaft extension 106 extends through table 73 and has connected thereto a cable 108 which operates a pen 109 which may be suitably spring-pressed normally in one direction. It is apparent that deviations in the tracks from a straight line will result in operating arm 100 in one direction or the other to shift pen 109 laterally relative to the chart and according to the behavior of the truck.

Another important track characteristic is the gauge, i. e., the distance between tracks. I provide upon the chart 10 a permanent record of variations in the track gauge. For this purpose, I provide a pair of arms 120 shown in plan in Fig. 10 and in elevation in Fig. 12. Each arm is pivoted intermediate its length at 121 on a link 122 pivotally connected at 123 to the car truck frame. The lower end of each arm or lever 120 is provided with a shoe of hardened steel adapted to engage the inside flange of the rail. Cables 126, 127, are connected to the upper end of the respective levers 120 and pass around pulleys 128, 129, to the opposite ends of an evener bar 130 pivoted on one end of a rack bar 131 normally held spring-pressed by a spring 132 in such direction as to hold the shoes 125 pressed against the inner flanges of the rails. It is obvious that if one or the other, or both, shoes 125 should move inwardly due to narrowing of the track gauge, the rack 131 would be operated against the action of spring 132 to actuate a transmitter 140 in one direction through suitable gearing shown more in detail in Fig. 11. Similarly widening of the track gauge would permit spring 132 to draw the rack in the opposite direction and actuate said transmitter in the opposite direction. The transmitter is electrically connected to a recording pen 135 in a manner similar to the described connection between transmitter 85 and the pen operated thereby. Side thrust of the truck without widening or narrowing of the rails will merely rock the evener bar 130 without affecting rack 131, since cable 126 will act oppositely to cable 127 and to the same degree.

It is sometimes necessary to raise the car off the tracks in which case the shoes 125 would swing outwardly to a degree which would render it difficult to bring said shoes again into engagement with the inner rail flanges. Other occasions such as in switch yards may arise when it is desired to render the track gauge recorded equipment inactive. Means are provided for this purpose in the form of a link 141 fixed to each link 122 and connected to a beam 142. Obviously raising of beam 142 will raise shoes 125 out of engagement with the rails and a fixed stop 143 prevents outward movement of said shoes. Beam 142 is normally pressed toward the ineffective position by a pair of balanced springs 145 fixed at one end and connected at the other ends to the beam. To lower the beam and shoes to effective position, the beam is connected centrally to the piston 146 of a cylinder 147 controlled by some fluid under pressure, such as steam or compressed air, supplied by a pipe 148 and controlled from the interior of the car. Turning on the supply of fluid pressure will, therefore, depress piston 146 and beam 142 and render the track gauge recorder device effective, while removing the pressure permits the springs 145 to render the equipment inactive. In lowering the shoes the cams 150' guide them inwardly over the end of stops 143 so as to insure their engaging the inner flanges of the rails. When clear down, the levers 120 are free from the guiding effect of this cam.

It may occur that in passing over the break in the rail caused by an "end on" open frog, or by some defect or other structure of the rails, that one shoe 125 will move outwardly to such distance as to pass down the branch track or otherwise so that it will not again engage the inside rail flange after it has passed over the break. For this purpose the shoes are provided with up-turned ends 149, and further, with retarding means which after the shoes 125 have moved outwardly a predetermined distance will become operative to retard the outward movement. The structure employed is purely illustrative as shown in Fig. 11, and is contained preferably within transmitter box 140. The rack 131 is shown as actuating a pinion 150 on the transmitter shaft so that said transmitter will be responsive to the movements of rack 131. Fixed upon the same shaft with pinion 150 is a ratchet 151 with which engages a pawl 152 on a gear 153 which meshes with a pinion 154 on the same shaft with which is mounted an escapement wheel 155 with which co-operates an escapement pawl 156. Pawl 152 is normally pressed by a guided or constrained spring 158 toward the end 159 of an arcuate slot 160. As the pinion 150 and ratchet 151 rotate, however, due to movement of the rack in the direction of the arrow, pawl 152 is forced to the opposite end of the slot, the gear 153 being inactive throughout this period. Further movement of ratchet 151 in the same direction will cause gear 153 to rotate together with pawl 152 to actuate the escapement which limits the speed of movement of the entire system and hence of rack 131 when the shoes are moving outwardly. For a predetermined degree of movement of the shoes, (i. e., until pawl 152 has been operated to the other end of the slot), the transmitter can be operated at any speed to respond quickly to changes in track gauge; beyond these limits the escapement becomes effective to retard the speed of outward movement of the rack 131 (and hence of the shoes) to prevent movement of the shoes within a safe distance of the point where ends 149 are no longer effective and it is difficult for the shoes to re-engage the inner flanges of the tracks. If desired, the retarding means may be rendered effective upon any outward movement of the shoes, this being accomplished merely by eliminating the slot 160 and fixing pivot 159 upon gear 153.

Still another record which may be obtained on chart 10 is that of the low rail joints. A device for this purpose is shown in Figs. 13 to 16 and comprises essentially a cylinder 160 mounted upon the arch bar 161 or similar supporting member of the car truck, and a piston 162 having a piston rod 163 connected in some suitable manner to the journal box 164 to partake of the movements thereof relative to the other two wheels when passing over rail joints. The connection shown comprises a cross-head 165 to which is fixed a member 166 operating on a pair of guides 167 and having a universal connection 168 with an arm 169. Said arm is fixed to a bracket 170 resting upon the journal box. It is obvious that in this manner the piston will be depressed to a degree corresponding to the degree of vibration of the journal box, caused by passing over a rail joint. To obtain a permanent record of the vibrations which thus indicates the condition of the rail joints, the piston is adapted to operate one or more of the plurality of pens 180 to 185 progressively depending upon the degree of vibration. For this purpose a plurality of contacts 171 (here shown as 6 in number, although any suitable number may be employed) are positioned at various elevations in stepped formation so that the piston will engage a number of said contacts proportioned to the depression. The engagement of the piston with each contact is adapted to close a circuit through an electromagnet 180' to 185' to actuate the respective pen. As many pens are, therefore, provided as there are contacts. The pen may be normally out of contact with the chart and moved into engagement therewith when attracted by the magnet or it may be adapted to trace a straight line normally (as shown) but to be moved out of said line to form a notch 190 (see Fig. 15), when the magnet is energized. Instead of providing a plurality of pens, there may be provided a single pen with means for actuating it to different degrees, corresponding to the number of contacts engaged by the piston. In the form shown, the pens 180-185 are arranged in staggered relation on opposite sides of an ink-trough 186 into which they dip. This positioning facilitates the arrangement of the plurality of magnets and permits the use of larger magnets, but all the pens may be arranged on one side of the ink-trough if desired. The pens are arranged at the forward ends of spring arms, the rear ends of which are clamped in fixed supports 187. The pens normally trace straight lines on the chart, as shown in Fig. 15, but when their respective magnets are energized the spring arms are drawn to one side to register a notch 190. The number of notches at any joint indicates the condition thereof, thus, in Fig. 15, joint A caused only one-third the vibration as joint B, and therefore, the piston 162 engaged only one contact when the car passed over joint A, but engaged three contacts when passing over joint B.

The circuit of the six contacts each includes a second magnet 180'' to 185''. These, as seen by magnet 185'', each operate a counter 280 to 285 of ordinary progressive, additive type, except that the counter actuated by magnet 180'' progresses by single numbers or digits whereas 181'' has each notch representing two such digits, 182'' three such digits, etc., up to the last, which progresses by six digits at a time or any other rate of progression that may be arranged for. The total addition in each therefore shows values which are roughly in proportion to the magnitude of the faults, because it is only when the joint is so low that it allows the wheel to fall, say, ¾ of an inch that the pen 185 and the counter actuating magnet 185" are actuated, and so progressively backward through the series. This gives an opportunity to compare the work of the section men in different operating sections on the road.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted, and some of the features of each modification may be embodied in the other, and the invention extends to such use.

Claims:

1. In a track recorder, means actuated in accordance with the track characteristics, gyroscopic means for maintaining a fixed base-line, and means for indicating the movements of said first means relative to said base-line.

2. In combination with a railroad car, a track recorder carried by said car, means for maintaining a base-line fixed in space, and means whereby said recorder records the movements of said car relative to said base-line.

3. In combination with a railroad car, a track recorder carried by said car, means actuated in accordance with the difference in elevation between the rails of the track, gyroscopic means for maintaining a base-line unaffected by movements of the car, and means whereby said recorder records the movements of said first means relative to said base-line.

4. In combination with a railroad car, a track recorder carried by said car, means actuated in accordance with the difference in elevation between the rails of the track, gyroscopic means for maintaining a vertical base-line unaffected by movements of the car, means whereby said recorder records the movements of said first means relative to said base-line, and means whereby said recording means operates independently of the movements of the car.

5. In a track recorder, means for maintaining a base-line fixed in space, a beam, means for rendering the ends of said beam responsive to elevation of the respective rails so that said beam is rocked in accordance with differences in elevation between the rails of the track, and means for indicating the movements of said beam relative to said base-line.

6. In a recorder for a railroad car, gyroscopic means for maintaing a fixed base-line in azimuth, and means whereby said recorder records the movements of said car relative to said base-line, said last named means including a transmiter actuated by said gyroscopic means during relative movement of said car and base-line, and means whereby said transmitter actuates said recorder.

7. In a track-recorder for a railroad car having a relatively movable car-truck, means whereby said recorder records the movements of said truck relative to the car, said means including a member movably mounted on said car and having one end connected to said truck to be moved thereby and the other end connected to said recorder.

In testimony whereof I have affixed my signature.

ELMER A. SPERRY.